June 2, 1953  G. L. KUHL  2,640,613
UNLOADING DEVICE FOR VEHICLES
Filed Aug. 29, 1949  2 Sheets-Sheet 1

INVENTOR.
GERALD L. KUHL
BY Chas. C. Reif.
ATTORNEY

June 2, 1953  G. L. KUHL  2,640,613
UNLOADING DEVICE FOR VEHICLES
Filed Aug. 29, 1949  2 Sheets-Sheet 2

INVENTOR.
GERALD L. KUHL
BY Chas. C. Reyf
ATTORNEY

Patented June 2, 1953

2,640,613

UNITED STATES PATENT OFFICE 2,640,613

UNLOADING DEVICE FOR VEHICLES

Gerald L. Kuhl, Detroit Lakes, Minn.

Application August 29, 1949, Serial No. 112,997

7 Claims. (Cl. 214—82)

This invention relates to a device for unloading a vehicle body of grain, silage, bulk material or package material. This invention is adapted to unload any size of a vehicle body. It is desirable to have a mobile unloading device which can be conveniently moved about and which can be placed on even or uneven ground. It is also desirable to have an unloading device which can be adapted to be used with any vehicle body and comprising a simple, efficient and easily operated means.

It is an object of this invention to provide a simple and efficient device for unloading a vehicle body and one which is easily attached and set up in operative position.

It is a further object of this invention to provide a device with a readily adjustable means of attachment to a vehicle body for unloading the same and which is adaptable to be securely placed on uneven as well as even ground.

It is still further an object of this invention to provide a self powered unloading device comprising a driven rotating member having readily interfitting and detachable engagement with another rotating member carried in means attached to the vehicle body and operating a load discharging member.

It is more specifically an object of this invention to provide a portable frame, a rotatable shaft journaled in said frame, a motor driven means for rotating said shaft and a second rotatable shaft journaled in brackets secured to said vehicle body, said shafts being inter-engageable at either end thereof whereby said second shaft can be rotated from said first shaft, said second shaft operating an unloading member.

These and other objects and advantages of the invention will be fully set forth in the following description made in connection with the accompanying drawings in which like reference characters refer to similar parts throughout the several views and in which.

Figure 1:
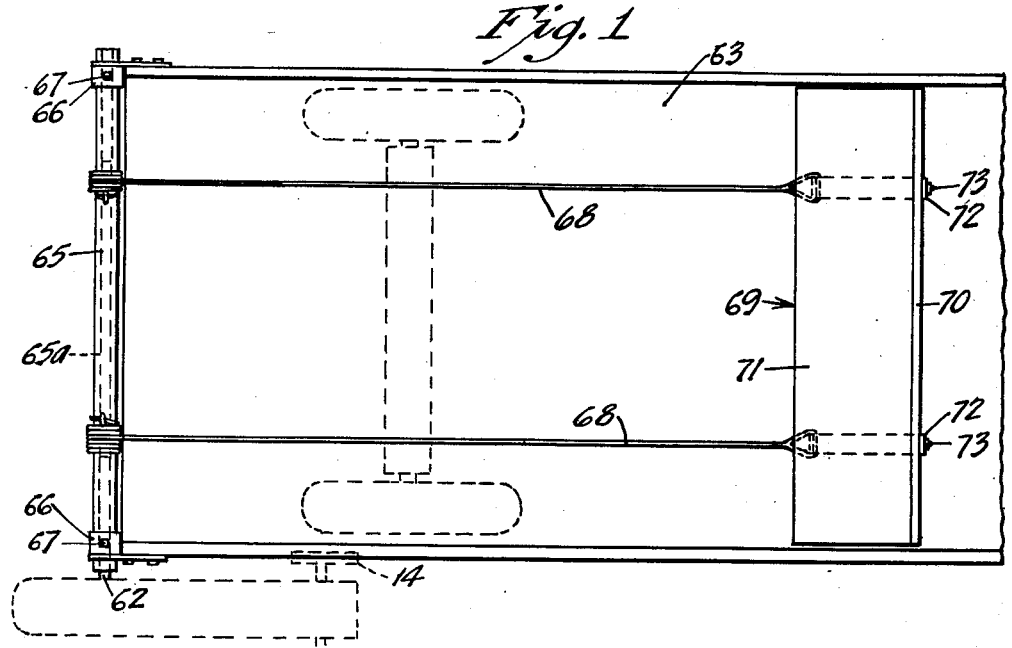
Fig. 1 is a top plan view of a vehicle body.

Referring to the drawings, a device is shown comprising a frame structure 10. While this frame could be variously constructed, in the embodiment of the invention illustrated it is shown as comprising a pair of spaced angle bars 10a having horizontal flanges extending away from each other and thus having their adjacent flanges vertical. Members 10a are connected adjacent one end, which will be designated the rear end, by a transversely extending angle member 10b having one flange engaging the tops of member 10a and the other flange extending at right angle to said top. The other ends of members 10a are connected by a cross piece 10c in the form of an angle member having one flange in substantially the same plane as the horizontal flanges of members 10a and having a downwardly extending flange. Said horizontal flange has beveled ends.

A pivot member 11 projects forwardly from the downwardly extending flange of member 10c and an axle member 12 has a central portion swingably mounted on member 11. Axle 12 has end portions on which are journaled wheels 14 and held thereon by headed bolts 15.

Spaced from the rear end of said frame is a strut support 16 comprising spaced leg members 16a having secured thereto a bottom cross member 16b. Said leg members are secured to the vertical flanges of members 10a in any suitable manner, as by welding. Said leg members are further secured to said frame by braces 10c formed in the form of rods and inclined upwardly from intermediate portions of leg members 16a to engage said vertical flanges of members 10a to which they are secured. Secured to the vertical flanges at the rear end of said frame 10 is a U-shaped handle 17 preferably formed of a round rod.

At the front end of frame 10 is a mounting structure. A flat bar 18 extends between and is supported on members 10a. Said bar has upwardly extending end portions 18a. The upper parts of portions 18a are provided with aligned bores 18b in which is rotatably mounted a shaft 19 having a head at one end and provided with an aperture 19a at its other end adapted to receive a retaining cotter pin 20. Bar 18 has apertures 18c adjacent its end portions and depending therethrough are hook bolts 21 which engage under the vertical flanges of members 10a. The upper ends of said bolts are threaded to receive nuts 22 engaging the upper side of bar 18. Rotatably mounted on said shaft 19 are spaced collars 23 one of which is provided with a set screw 23a adapted to engage shaft 19. Secured to the collars 23 respectively in any suitable manner, as by welding, are forwardly extending flat bars 26. Bars 26 are each provided with a pair of spaced elongated slots 26a. A third collar 24 is rotatably mounted on said shaft 19 between said collars 23 and is provided with a set screw 24a adapted to engage the shaft 19.

A rather short plate 70 is secured horizontally to said collar 24 and is disposed a short distance above bar 18.

A motor 25 is provided having an attaching flange 25a having holes therein through which pass headed and nutted bolts 32. Bolts 32 also pass through slots 26a. The slots 26a provide for the adjustment of the motor longitudinally of the bars 23. Mounted on the driving shaft 25b of said motor is a pulley 27. Spaced rearwardly from said motor are a pair of bearing brackets 28 secured respectively to the tops of members 10a by screws 29. Journaled in said bearing brackets 28 is a shaft 30. Said shaft has a reduced portion on which is secured a pulley 31. Pulley 31 is retained on shaft 30 by a collar 35 pinned or otherwise secured to shaft 30. Running over pulleys 27 and 31 is a belt 33. Formed on shaft 30 is a pinion 34. Meshing with pinion 34 is a gear 36. Gear 36 is rotatably mounted on a shaft 37, the ends of which are secured to the tops of members 10a in any suitable manner, as by welding. A collar 38 is secured to shaft 37 between one framed member 10 and gear 36.

Disposed at one side of gear 36 and against the same is a double cam 39 having portions at opposite sides of shaft 37. Cam 39 is secured to gear 36 by headed and nutted bolts 49 extending through the said cam and gear.

Spaced rearwardly of shaft 37 is a pair of bearing brackets 40 disposed on the tops of members 10a and secured thereto by bolts or screws 64. Journaled in bearing brackets 40 is a sleeve 41 having an opening 41a therethrough of polygonal shape in cross section. Secured to sleeve 41 is a ratchet wheel 42. A lever 43 is provided having a pair of arms 43a bored to receive ball bearings surrounding sleeve 41 and said lever oscillates in said bearings. Lever 43 has a pair of laterally spaced forwardly extending arms 43b between the ends of which extends a pin 44 on which is journaled a cam roller 45 disposed to be engaged by cam 39. A pawl 46 is disposed between arms 43b and is oscillatable on a pin 47 extending between said arms. Pawl 46 constitutes a driving pawl for ratchet wheel 42 and is held in engagement with said wheel by a plate spring 52 secured in a portion 43c extending between arms 43b. Lever 43 has a pair of laterally spaced upwardly extending arms 43c between the upper ends of which extends a pin 50.

A bar 51 is provided having an elongated slot therein through which passes pin 50. Bar 51 has a rear end portion 51a threaded to receive a threaded front end of a crank 53 journaled in a bar 10c upstanding from and secured to angle member 10b. Collars at either side of bar 10c are provided to prevent longitudinal movement of said crank. The end of said threaded portion of crank 53 is slightly headed to prevent complete withdrawal from rear end portion 51a. A pair of short spaced arms 54 are secured to and extend forwardly from member 10b centrally thereof and a stop pawl 55 for ratchet wheel 42 is disposed between said arms and swingably mounted on a pin 56 extending between said arms. Pawl 55 has a lower end engaging ratchet wheel 42 and held thereagainst by a tensile coiled spring 58 secured at one end to the upper end of pawl 55 and at its other end to a small eye bolt 59 secured in bar 10c.

A cover or housing 60 is provided to enclose the parts 28, 36, 39, 42, 43 and 51, the same being substantially rectangular in vertical cross section and open at its bottom. The top of said housing rests at its rear end upon a plate 61 secured to the top of bar 10c and the front end of said housing has a lip adapted to be disposed under a small rod extending between members 10a. Housing 60 has notches or recesses in its side portions in which bearing brackets 40 are disposed.

Figure 2:
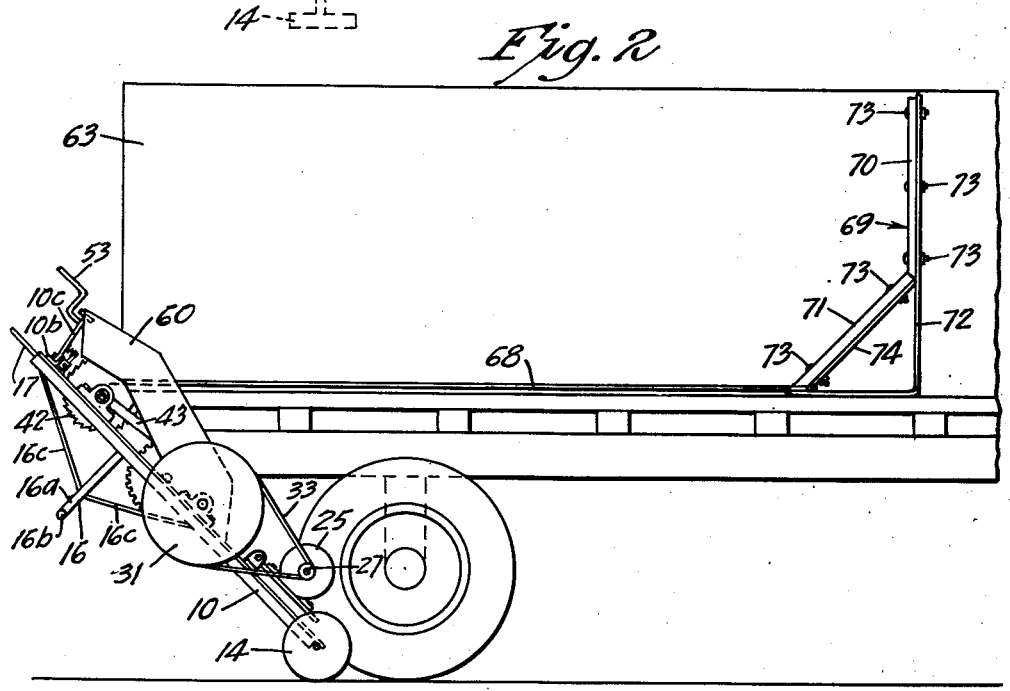
Fig. 2 is a view in side elevation of the unloading device attached in operating position to a vehicle body.
Figure 3:
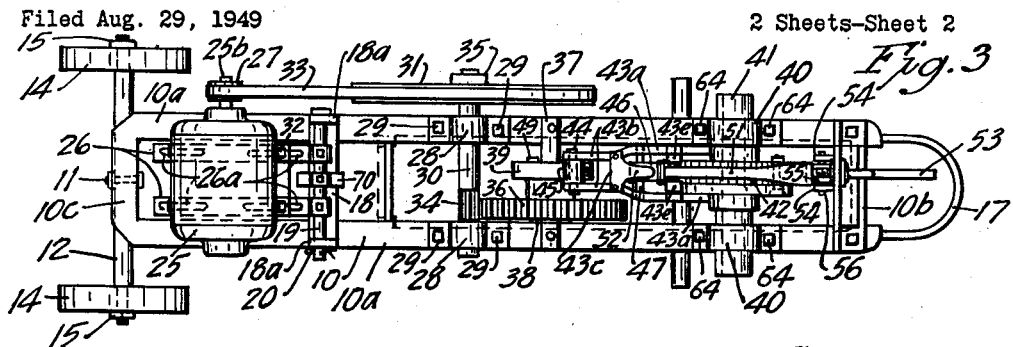
Fig. 3 is a top plan view of the unloading device with some parts shown by dotted lines.
Figure 4:
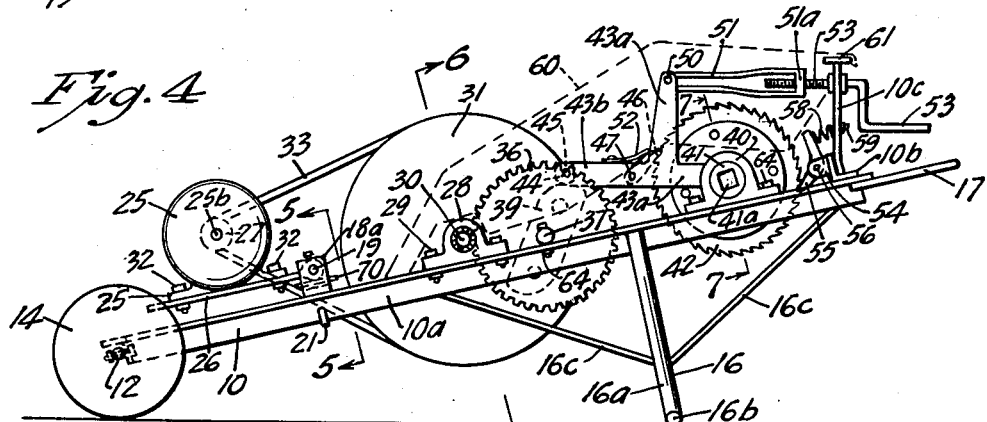
Fig. 4 is a view of the unloading device in side elevation with some parts shown by dotted lines.
Figure 5:
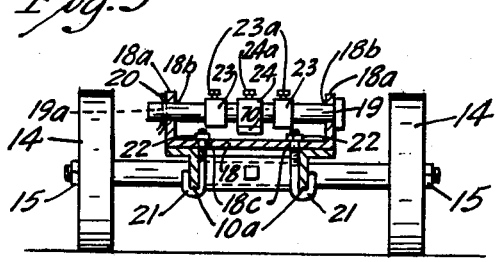
Fig. 5 is a view taken on line 5—5 of Fig. 4 in the direction indicated by the arrows with some parts in vertical section.
Figure 6:
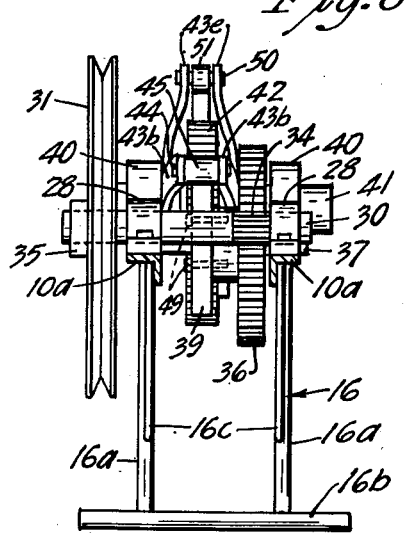
Fig. 6 is a view taken on line 6—6 of Fig. 4 in the direction indicated by the arrows with some parts shown by dotted lines.
Figure 7:
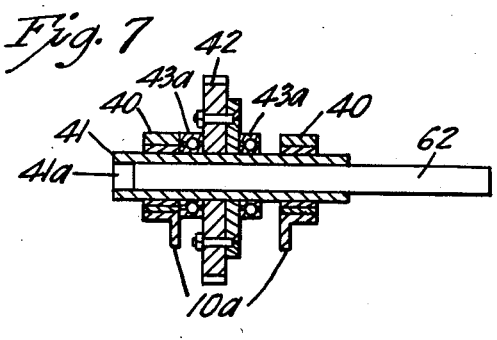
Fig. 7 is a view in vertical section taken on line 7—7 in Fig. 4 in the direction indicated by the arrows.

A shaft 62 of polygonal shape in cross section is provided and the same is constructed to fit in opening 41a in sleeve 41. Said shaft is of a length to extend at some distance at either end of said sleeve. Said shaft is mounted loosely in said sleeve to be movable longitudinally therein. In Figs. 1 and 2 is shown the vehicle body 63 of a wagon or truck.

A sleeve 65 is provided having an opening 65a therethrough of polygonal shape in cross section and adapted to receive shaft 62. Brackets 66 are provided and are adapted to be bolted to the bottom of body 63 at its rear end and adjacent each side thereof. Sleeve 65 is journaled in said brackets and extends beyond said brackets at each end. Brackets 66 are respectively provided with set screws 67 to secure said sleeve and to limit the lateral movement of said sleeve in said bracket. Secured to sleeve 65 in any suitable manner, as by eye members, are cables 68. Said cables are adapted to be wound on sleeve 65. The said cables are secured at their other ends to a sliding panel 69 having an upper vertical portion 70 and a lower portion 71 extending at substantially an angle of 45 degrees. Portion 70 is shown as secured to spaced strap iron bars 72 by headed and nutted bolts 73. The lower portions of said strap iron bars 72 are adapted to slide on the bottom of vehicle body 63. Spaced flat plates or bars 74 underlie portion 71 and are secured thereto by headed and nutted bolts 73. Said last spaced bars are secured in any suitable manner, as by welding, at their lower and upper ends respectively to the horizontal and vertical portions of strap members 72. Cables 68 are passed around the lower ends of members 74.

In operation when the vehicle body 63 is full of material the sliding panel 69 will be at the front end of said body and at the front end of said material. The unloading device is now brought alongside the rear end of the vehicle body, as shown in Fig. 2, and the projecting end of the shaft 62 is inserted in the end of sleeve 65. The shaft 62 can be moved laterally to suit the positions of the unloading device and the vehicle body. The frame 10 is supported on wheels 14 and strut member 16. Said wheels 14 are secured to axle 12 which is pivotally mounted on frame 10 giving said axle some vertical movement and thus allowing said wheels to rest firmly on uneven ground. Motor 25 will now be operated and gear 36 will be driven and will rotate cam 39. The rotation of said cam will oscillate pawl lever 43 and drive ratchet wheel 42. Since member 39 is a double cam, ratchet wheel 42 will be given a rotated impulse twice in each revolution of gear 36. When ratchet wheel 42 rotates it rotates sleeve 41 and shaft 62 therein. Shaft 62 is disposed in sleeve 65 and rotates the same. Cables 68 are then wound about sleeve 65 and simultaneously move the sliding panel 69 toward the rear of the vehicle body 63 and thus push the load of material out at the rear end of said vehicle body.

The motor mounting structure is adjustable to accommodate various sized attaching bases of motors. The metal bars 26 are secured to collars 23 which are movable laterally on shaft 19 for adjustment to accommodate various widths of motor bases and the elongated slots 26a make allowance for various lengths of said bases. When set screw 22a is tightened any lateral movement of said motor as mounted on said bars is prevented on shaft 19. The motor as mounted on said bars 26 with set screw 26a tightened is rotatably movable with bar 19 as an axis. The motor is used to tighten the driving belt running over pulleys 27 and 31 by gravity. The short plate 70 is provided to prevent any sharp downward movement of the motor. When set screw 24a is tightened, said plate can only move downwardly a short distance before engaging bar 18 thus restricting the downward movement of said motor.

The crank 53 is provided to adjust the lever 43, which lever is oscillated by cam 39. Lever 43 in turn rotates the ratchet wheel 40. Rotation of said crank will adjust said lever and control the extent of the oscillation of same and thus govern the speed of rotation of said ratchet wheel. Said lever can be adjusted while the unloading device is being operated.

Thus it will be seen that I have provided an efficient and easily handled unloading device which can be readily attached to a vehicle body adapted to the use of same. The rate of speed with which the vehicle body is being unloaded can be increased or decreased while the device continues in operation.

This device has been successfully demonstrated in actual practice and has been found to be very efficient and to greatly increase the speed with which a vehicle body can be unloaded. This device has great economic value as a time saver in the ease and speed with which a vehicle body can be unloaded and a labor saving device in reducing the amount of help required to unload a vehicle body. This device is now being made on a commercial basis.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for unloading a vehicle body having in combination, a rotatable member with exposed ends mounted adjacent the end portion of said body, a load discharging member disposed in said body and movable therein, means connecting said load discharging member and said rotatable member for moving said load discharging member by rotation of said rotatable member, a device adapted to be positioned at either side of said body comprising a frame, means for supporting said frame, brackets mounted on said frame, a sleeve rotatable in said brackets and movable laterally therein and inter-engageable with the ends respectively of said rotatable member, a ratchet wheel mounted on said sleeve intermediate the ends thereof, a lever swingingly mounted on said sleeve, said lever having a pawl for engaging said ratchet wheel and having a cam roller thereon, a cam for engaging said roller and oscillating said lever, means for varying the position of the cam roller in operating position for varying the speed of rotation of said ratchet wheel comprising a stop member engaged by said lever and means for varying the position of the stop member.

2. The structure set forth in claim 1, said stop member comprising a bar having a slot therein, said lever having a portion carrying a pin disposed in said slot, a screw journaled in said frame and engaging said bar for moving the same, and a crank for turning said screw.

3. A device for unloading a vehicle body having in combination, a rotatable member with exposed ends mounted adjacent the end portion of said body, a load discharging means movable in said body, a means joining said member and said load discharging means and adapted to move said load discharging means when said member is rotated, a device adapted to be positioned at either side of said body comprising a frame, means for supporting said frame, a sleeve journaled in said frame movable laterally of said frame and having ends adapted to be inter-engaged with the ends respectively of said rotatable member, means for rotating said sleeve, a motor for driving said last mentioned means, and means secured to said frame adapted to adjustably hold said motor.

4. The structure set forth in claim 3, said means for holding said motor comprising a bar extending transversely of said frame, and means for holding said bar in different positions on said frame, said bar having upstanding ends with a rod journaled in said bar and extending transversely of said frame, a pair of longitudinally spaced bars swingably mounted on said rod and secured thereto and said motor secured to said bars.

5. The structure set forth in claim 4, said frame constructed of longitudinally spaced angle members having horizontal flanges facing each other and vertical flanges depending therefrom and hook bolts carried by said bar carried on and extending transversely between said frame, said hook bolts being adapted to engage said vertical flanges and be movable longitudinally thereon.

6. The structure set forth in claim 4, said spaced bars extending longitudinally of said frame having collars secured to their ends and journaled on said rod, means for securing one of said collars to said rod and said spaced bars having longitudinally spaced slots therein.

7. The structure set forth in claim 4, said bar having upstanding ends in which said rod is disposed extending therebetween, a third collar journaled on said rod, means for securing said third collar to said rod, a flat plate carried by said collar and adapted to engage the central portion of said bar upon rotation of said rod.

GERALD L. KUHL.

References Cited in the file of this patent

UNITED STATES PATENTS

| Number | Name | Date |
|---|---|---|
| 1,135,073 | Swarner | Apr. 13, 1915 |
| 1,724,713 | Johnston | Aug. 13, 1929 |
| 2,097,729 | Mall | Nov. 2, 1937 |
| 2,340,983 | Pfeiffer et al. | Feb. 8, 1944 |
| 2,355,226 | Mallory | Aug. 8, 1944 |
| 2,448,122 | Recker | Aug. 31, 1948 |
| 2,488,217 | McCall | Nov. 15, 1949 |
| 2,495,358 | Wengert | Jan. 24, 1950 |
| 2,512,339 | Knapp, Jr. | June 20, 1950 |
| 2,537,381 | Turner et al. | Jan. 9, 1951 |
| 2,563,158 | Claffey | Aug. 7, 1951 |
| 2,599,741 | Bishman et al. | June 10, 1952 |